United States Patent [19]
Schmidt et al.

[11] Patent Number: 6,101,608
[45] Date of Patent: Aug. 8, 2000

[54] METHOD AND APPARATUS FOR SECURE REMOTE WAKE-UP OF A COMPUTER OVER A NETWORK

[75] Inventors: Thomas J. Schmidt, Milford, N.H.; Larry Huppert, Sudbury, Mass.; Simoni Ben-Michael, Givat Zeev; Michael Ben-Nun, Jerusalem, both of Israel

[73] Assignee: Compaq Computer Corporation, Houston, Tex.

[21] Appl. No.: 08/804,097

[22] Filed: Feb. 20, 1997

[51] Int. Cl.$^7$ .................................................. G06F 11/00
[52] U.S. Cl. ............................................. 713/202; 380/25
[58] Field of Search ..................... 395/188.01, 182.11, 395/182.13, 182.16, 182.2, 182.21, 182.22, 182.03, 183.06, 183.08, 183.12, 183.15, 183.19, 183.2, 185.01, 187.01, 200.11; 714/712, 713, 733, 749; 364/488, 489, 550; 370/241, 252, 401; 380/3, 4, 23, 25, 49; 713/200, 201, 202

[56] References Cited

U.S. PATENT DOCUMENTS

| | | | |
|---|---|---|---|
| 4,652,990 | 3/1987 | Pailen et al. | 364/200 |
| 5,144,667 | 9/1992 | Pogue, Jr. et al. | 380/45 |
| 5,146,472 | 9/1992 | Hallman | 375/8 |
| 5,349,642 | 9/1994 | Kindon | 380/25 |
| 5,390,324 | 2/1995 | Burckhartt et al. | 395/575 |

(List continued on next page.)

FOREIGN PATENT DOCUMENTS

0373278  12/1988  European Pat. Off. .

OTHER PUBLICATIONS

Jim Brown, Vendors broadening system Management base, Network World (Journal), pp. 15–16, Apr. 1991.

Mark McManus, Digital delivers new high at the low end, Digital systems Report (Journal), pp. 33–35, Nov. 1997.

PR Newswire, Microcom announces MLB release 2.0; New release includes network Management, pp. 1–2, May 1990.

Dennis F. Raynoha, "teleswitch"—Enables remote powering–up and Down of personal or Microcomputer, p. 1, Jun. 1986.

Craig A. Bergman, A password–protected power controller, Southern Tier Technical conference, 1988, Proced. IEEE, pp. 252–257, Jun. 1988.

Bellovin et al., An attack on the interlock protocol when used for authentication, IEEE trans. on information theory, vol. 40, No. 1, pp. 273–275, Jan. 1994.

(List continued on next page.)

*Primary Examiner*—Robert W. Beausoliel, Jr.
*Assistant Examiner*—Nadeem Iqbal
*Attorney, Agent, or Firm*—Sharp, Comfort & Merrett, P.C.

[57] ABSTRACT

A method and related apparatus enables one station on a local area network (LAN) 24 to securely wake up another station on the LAN 24 although the stations may be physically remote from each other. A workstation 12, acting as a remote management console, generates a secure wake-up packet 42 intended for a desktop computer 14 on the LAN 24. The desktop computer 14 is operating in a sleep state. The data section of the secure wake-up packet has a particular sequence of data including a synchronization sequence 46, a MAC address sequence 48 and a password sequence 50. The desktop computer 14 has a network interface 64 for detecting and processing secure wake-up packets 70 when that network interface 64 is operating in a remote access control mode. The network interface 64 verifies that MAC address sequence 48 corresponds to the MAC address of the desktop computer 14 and that the password sequence 50 has a predetermined relationship with a password required to wake up the desktop computer 14. The network interface 64 issues a wake-up signal to wake up the desktop computer 14 when a valid secure wake-up packet is processed.

31 Claims, 10 Drawing Sheets

U.S. PATENT DOCUMENTS

| | | | |
|---|---|---|---|
| 5,404,544 | 4/1995 | Crayford | 395/750 |
| 5,535,409 | 7/1996 | Larvoire et al. | 395/800 |
| 5,623,601 | 4/1997 | Vu | 395/187.01 |
| 5,638,448 | 6/1997 | Nguyen | 380/29 |
| 5,726,541 | 3/1998 | Glenn et al. | 318/16 |
| 5,764,890 | 6/1998 | Glasser et al. | 395/188.01 |
| 5,793,952 | 8/1998 | Limsico | 395/188.01 |
| 5,802,305 | 9/1998 | McKaughan et al. | 395/200.57 |
| 5,825,891 | 10/1998 | Levesque et al. | 380/49 |
| 5,826,014 | 10/1998 | Coley et al. | 395/187.01 |
| 5,826,015 | 10/1998 | Schmidt | 395/187.01 |
| 5,835,719 | 11/1998 | Gibson et al. | 395/200.51 |

OTHER PUBLICATIONS

Implementation of Magic Packet™—Ready Motherboard, AMD, Jan. 1997, p.1.

Magic Packet™ Technology, AMD, Aug. 1996. pp. 1–2.

Magic Packet™ Technology, AMD, Glen Gibson, Nov. 1995, pp. 1–5.

AMD and HP Team to Deliver "Magic Packet™" for Remote Wake up of Networked Green PCs, AMD, Mar. 1995.

AMD First with Magic Packet™ Technology on FAST Ethernet Chip, AMD, Jun., 1996.

PCnet™—FAST, AMD, Jul. 1996.

IBM Ethernet Adapters Fact Sheet, IBM, Feb. 1996.

METHOD AND APPARATUS FOR SECURE REMOTE WAKE-UP OF A COMPUTER OVER A NETWORK

FIELD OF THE INVENTION

This invention relates generally to remote accesses to systems over a network, and more particularly to remote accesses that can wake up the systems.

BACKGROUND

A computer network is a collection of various devices connected together to share computer resources and communicate with each other. These devices, which can include end nodes (e.g., computer systems, printers, etc.) and network connection elements (e.g., hubs, switches, bridges, routers and gateways), interface the network through communication links. The gateways, routers, and switching hubs route data on the communication links to the other devices in the network. Industry has arranged such devices to produce numerous and diverse types of networks including wide area networks (WANs), metropolitan area networks (MANs), and local area networks (LANs). The devices on the networks communicate by transferring data in discrete quantities called packets. A packet can range from a few bits in length to several thousand, as determined by the type of network.

Managing the operation of a network involves performing various administrative and maintenance tasks, such as updating software and tracking network resources. These tasks often require communicating directly with many of the devices on the network. Ideally, such administrative access to the devices would occur during off-business hours, such as evenings and weekends, so as to minimize disruption of day-time business operations. Further, it would be advantageous if a network administrator could communicate with each device from a remote computer site. However, there is tension between this administrative convenience and the important interest of conserving electrical power. It is during these very off-business hours when some computer users might turn off the computer devices to conserve power, thereby frustrating the administrative process.

A significant problem posed by these turned off computer devices is how to gain access in order to perform the administrative duties. Time and resources must be spent finding and reaching the physical location of each device on the network in order to locally turn on those devices. Yet even after locating the device, other complications could still conceivably prevent the administrator from accessing the device, such as finding the turned off device behind locked office doors.

One particular approach to solving this problem is a mechanism for awakening a turned off device from a remote computer. The remote computer sends a special packet of data, called a wake-up packet, to the turned off device. An example of such a wake-up packet is Magic Packet™, developed by AMD®. The device is not entirely turned off, otherwise the device would be unable to detect the wake-up packet. Therefore, when the device is locally turned off by a user, the device actually continues operating, but in a sleep state. In the sleep state, a portion of the device still receives electrical power. The portion receiving the electrical power is capable of monitoring packet traffic on the network. Consequently, this portion wakes up the device upon detecting a wake-up packet appropriately addressed to the device. As a result, the network administrator who sent the wake-up packet to the device from a remote computer is able to remotely perform administrative and management activities on that device.

However, such a wake-up mechanism produces a new avenue by which unauthorized users can try to breach the security of the device. Before the development of wake-up packets, a device was deemed most secure when turned off. The act of turning off the device effectively disconnected the device from other devices on the network. No remote computer could use the network to communicate with that device. But now, in order to be able to detect wake-up packets, a device remains connected to the network even though the device has been locally turned off. By knowing the network address of this device and understanding the mechanics of wake-up packets, an unauthorized user could gain unchallenged access to the device. Once inside the device, the unauthorized user could then readily write and read any of the device's unprotected resources and could even attempt to break into those areas where sensitive information is stored. Thus, the mechanism exposes these devices to a new class and greater number of potential unauthorized users, i.e., the remote attacker.

For the foregoing reasons, there is a need for an improved method and apparatus that can remotely wake up devices operating on a network, yet avoid the problems of the aforementioned approach.

SUMMARY OF THE INVENTION

The present invention resides in a method and related apparatus for remotely and securely waking up a system over a network. The ability to wake up the system over the network from a remote site relieves network administrators from having to perform their administrative functions at the physical location of the system. But at the same time, the ability to remotely wake up a system, by itself, can make the system vulnerable to unauthorized users. The present invention improves upon non-secure remote wake-up by providing a mechanism by which remote wake-up of the system can be made secure.

In terms of the novel method, the invention can remotely wake up a system over a network. The invention detects a packet of data addressed to the system, determines whether the packet of data has a particular data sequence including a password sequence having a predetermined relationship with a password required to wake up the system, and provides electrical power to the system to wake up the system in response to determining that the packet has the particular data sequence. In one aspect, the processor-based system is a computer, and the invention executes software to bootstrap the computer in response to providing electrical power to the computer. In another aspect, providing electrical power to the system to wake up the system enables communication between a station coupled to the network and operating system software of the system.

Another aspect of the invention generates a new password, transmits the new password over the network and stores the new password in the system. Yet another aspect encrypts a newly generated password before transmitting the new password over the network. The new password can be stored in the system in response to receiving an acknowledgment of receipt of the new password.

In yet another aspect of the invention, the generating, transmitting and storing of a new password are repeated each time electrical power is supplied to the system to wake up the system. Thus, each subsequent generation of a new password synchronizes the new password between the system receiving the packet and the system sending the packet.

In terms of the novel apparatus, the invention comprises a network interface coupled to a network. The network interface can detect a packet of data addressed to the system and determine whether the packet of data has a particular data sequence including a password sequence having a predetermined relationship with a password required to wake up the system. The invention also includes a means for providing electrical power to the system in response to the network interface determining that the packet of data has the particular sequence.

Another aspect of the apparatus includes a memory storing data representing a mode in which the network interface is to operate when the system is operating in a sleep state. Still another aspect of the apparatus includes circuitry that detects when electrical power is being removed from the system and means for configuring the network interface according to the mode stored in the memory.

Other aspects and advantages of the invention will become apparent from the following more detailed description, taken in conjunction with the accompanying drawings.

DETAILED DESCRIPTION OF THE PREFERRED EMBODIMENT

Figure 1:
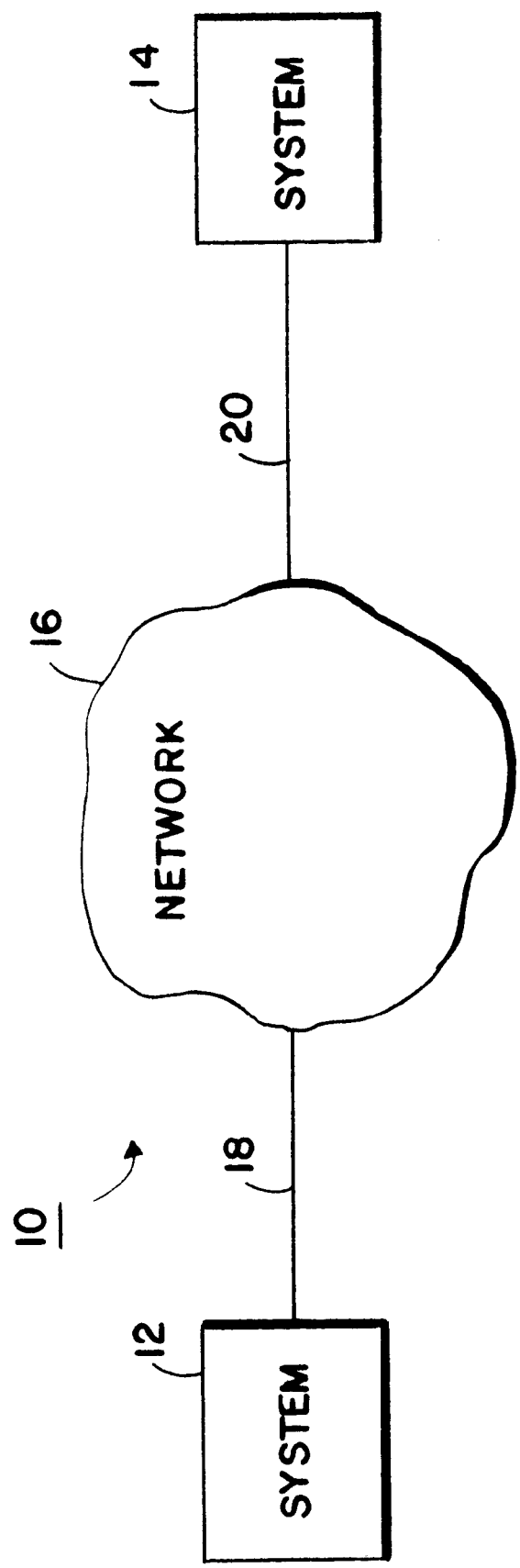
FIG. 1 is a block diagram of a network including systems connected to the network.

FIG. 1 shows an arrangement 10 embodying the principles of the invention. The arrangement 10 includes systems 12 and 14 connected to a network 16 by communication links 18 and 20. Systems 12 and 14 can be any of a variety of processor-controlled systems including computer systems (e.g., desktop computers, workstations, high-end multiprocessor computers), satellite systems, automotive systems, or consumer electronic devices like television sets and video cassette recorders. The network 16 can be any one or combination of a variety network types including LANS, MANs, or WANs. The communication links 18, 20 can be wired or wireless links to provide electrical, acoustical, or optical communication between the systems 12 and 14.

Figure 2:
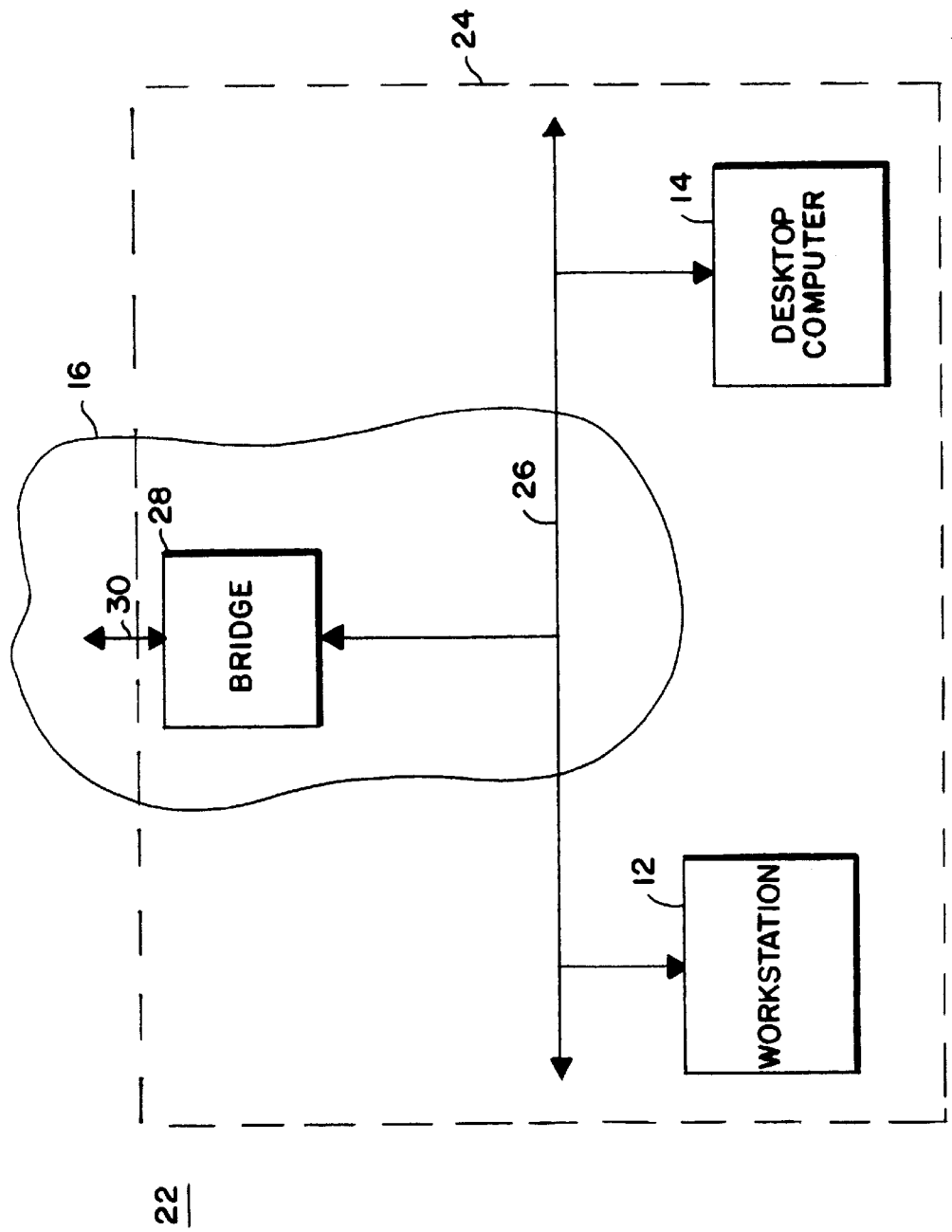
FIG. 2 is a block diagram of a specific embodiment of the network in FIG. 1, the specific embodiment including a local area network (LAN) configured as a bus and having a desktop computer and a workstation.

FIG. 2 shows a specific exemplary embodiment 22 of the arrangement 10. The specific embodiment 22 includes a local area network (LAN) 24. LANs can be configured using a number of topologies, such as stars, rings, token rings, buses or hierarchies. For the purpose of illustrating the principles of the invention, the LAN 24 is configured as a bus such as Ethernet™. Any other LAN topology or network type (e.g., WANs, MANs) can similarly illustrate the principles of the invention.

The LAN 24 includes stations 12, 14, and 28 connected to each other by a communication link 26. Stations 12 and 14 correspond to the systems 12 and 14 of FIG. 1 and may be any one of various types of computer devices such as desktop computers, workstations, terminals and printers. For exemplary purposes throughout the detailed description, the station 12 is described as a workstation and station 14 as a desktop computer. The station 28 is described as a bridge, but any network device capable of providing an interface to the network 16 through the external communication link 30 could have served this description. Examples of such network devices include gateways, routers, hubs, and repeaters.

Every station 12, 14, 28 on the LAN 24 is identified by an unique address. With regard to the Ethernet™ topology, these unique addresses are called medium access control (MAC) addresses. A MAC address has a six octet format (an octet is 8 bits of data). Each station 12, 14, 28 maintains a list of its own MAC address and the MAC addresses of those stations that receive and transmit information through that station. For example, the bridge 28 keeps its own MAC address and the MAC addresses of the other stations 12–14. Hence, the bridge 28 recognizes messages on the external communication link 30 directed to the workstation 12, the desktop computer 14 or itself and forwards such messages accordingly.

The stations 12, 14, 28 transmit and receive information over the communication links 26, 30 in the form of packets. The format of the packets depends upon the communication protocols employed on the LAN 24. In the present illustration, the packets include a header section and a data section. The header section includes a source field and a destination field. The information transmitted in the source and destination fields are the MAC addresses of the transmitting and receiving stations, respectively.

Packets of data may be directed to any one or all of the stations 12, 14, 28 on the LAN 24. The header of a packet directed to one station specifies the particular MAC address of that station in the destination field. A packet directed to all devices on the LAN 24 is called a broadcast packet. A broadcast packet can be identified by a particular address in the destination field. In LAN 24, the particular destination address that identifies the packet as a broadcast packet has six octets of FF. (where h means hexadecimal). Each station 12, 14, 28 in the LAN 24 accepts a broadcast packet as though the packet had been specifically addressed to that station.

According to the principles of the invention, certain types of packets are capable of waking up those stations to which the packets are addressed. Thus, a transmitting station is able to remotely wake up a receiving station by sending this type of packet to the receiving station. Such packets are hereafter called wake-up packets. For example, the workstation 12 as a transmitting station can remotely wake up the desktop computer 14 as a receiving station by sending a wake-up packet to the desktop computer 14. This process of waking up the desktop computer 14 is hereafter called a remote wake-up operation. The ability of wake-up packets to wake up the desktop computer 14 is unaffected by having to pass through bridges and routers across the network 16. More detail regarding the meaning of waking up a station is provided in connection with FIG. 5.

There are at least two types of wake-up packets that can be used to perform a remote wake-up operation: non-secure wake-up packets and secure wake-up packets. As these labels suggest, a difference between non-secure and secure wake-up packets is that secure wake-up packets have a security feature that validates the execution of remote wake-up operations. This security feature serves to restrict remote wake-up operations to authorized users.

NON-SECURE WAKE-UP PACKET

Figure 3:
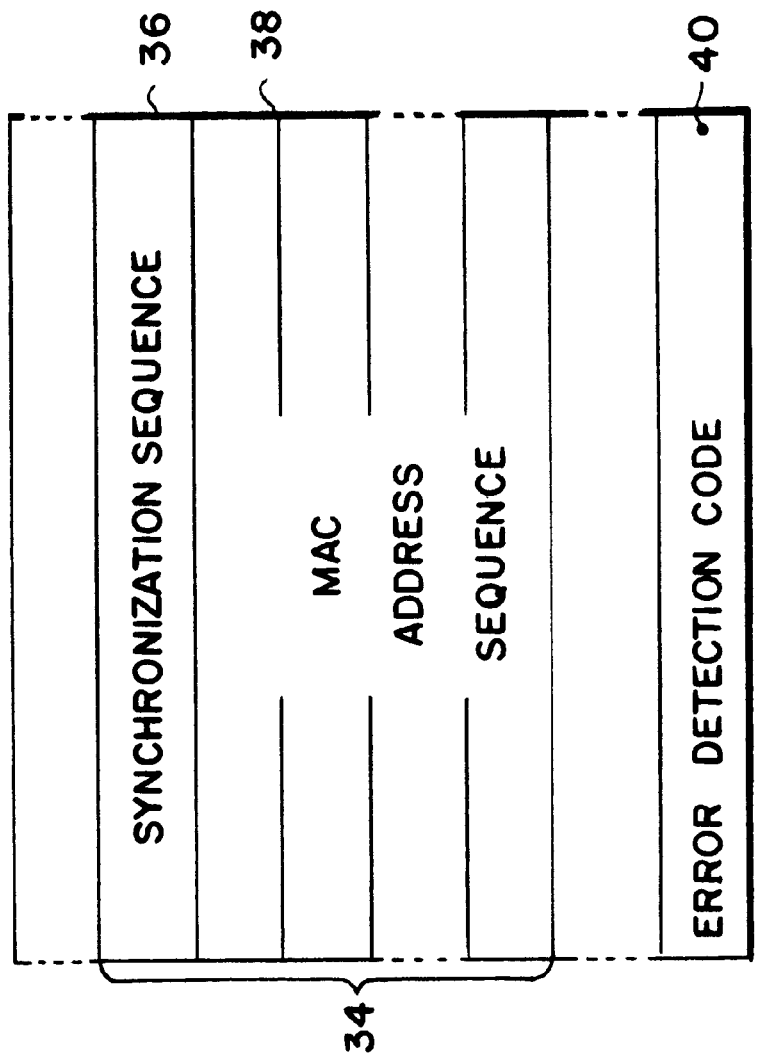
FIG. 3 is an illustration of a non-secure wake-up packet including a synchronization data sequence and a MAC address data sequence.

FIG. 3 shows the data section of a non-secure wake-up packet 32 for remotely waking up a station on the LAN 24 such as the desktop computer 14. The non-secure wake-up packet 32 includes a portion 34 having a synchronization sequence 36 and a MAC address sequence 38. A conventional synchronization sequence 36 contains six octets of all "1"s data, i.e., FFh FFh FFh FFh FFh FFh. The synchronization sequence 36 signals the start location for the MAC address sequence 38 in the packet 32 and notifies the desktop computer 14 that a potential wake-up packet has been received. The synchronization sequence 36 and MAC address sequence 38 are what distinguish non-secure wake-up packets 32 and, similarly, secure wake-up packets from other types of packets sent to the desktop computer 14.

The MAC address sequence 38 follows the synchronization sequence 36. The MAC address sequence 38 includes sixteen successive repetitions of the six-octet MAC address of the desktop computer 14. A non-secure wake-up packet 32 with valid synchronization 36 and MAC address sequences 38 is a valid wake-up packet.

An error detection code 40, four octets in size, is included at the end of the packet 32. Typically, there is but one error detection code 40 per non-secure wake-up packet 32. Also, the non-secure wake-up packet 32 can have other data following the MAC address sequence 38 and preceding the error detection code 40. Schemes for calculating the error detection code 40 from the data contents of the non-secure wake-up packet 32 are known in the art. One exemplary scheme is cyclic redundancy code (CRC). The above-described portion 34 can be anywhere in the data section of the non-secure wake-up packet 32.

For example, the portion 34 of a non-secure wake-up packet 32 directed to the desktop computer 14 having a MAC address of 01h 02h 03h 04h 05h 06h would include the following:

FF FF FF FF FF FF 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06.

A non-secure wake-up packet 32 can be made to remotely wake up multiple stations on the LAN 24. The data section of such a non-secure wake-up packet 32 would include an appropriate portion like portion 34 for each targeted receiving station. Each appropriate portion would include a MAC address sequence 38 tailored accordingly to correspond to the MAC address of the station specifically targeted by that appropriate portion. Non-secure wake-up packets 32 that address multiple stations have only one error detection code 40, which is included at the end of the non-secure wake-up packet 32.

SECURE WAKE-UP PACKET

Figure 4:
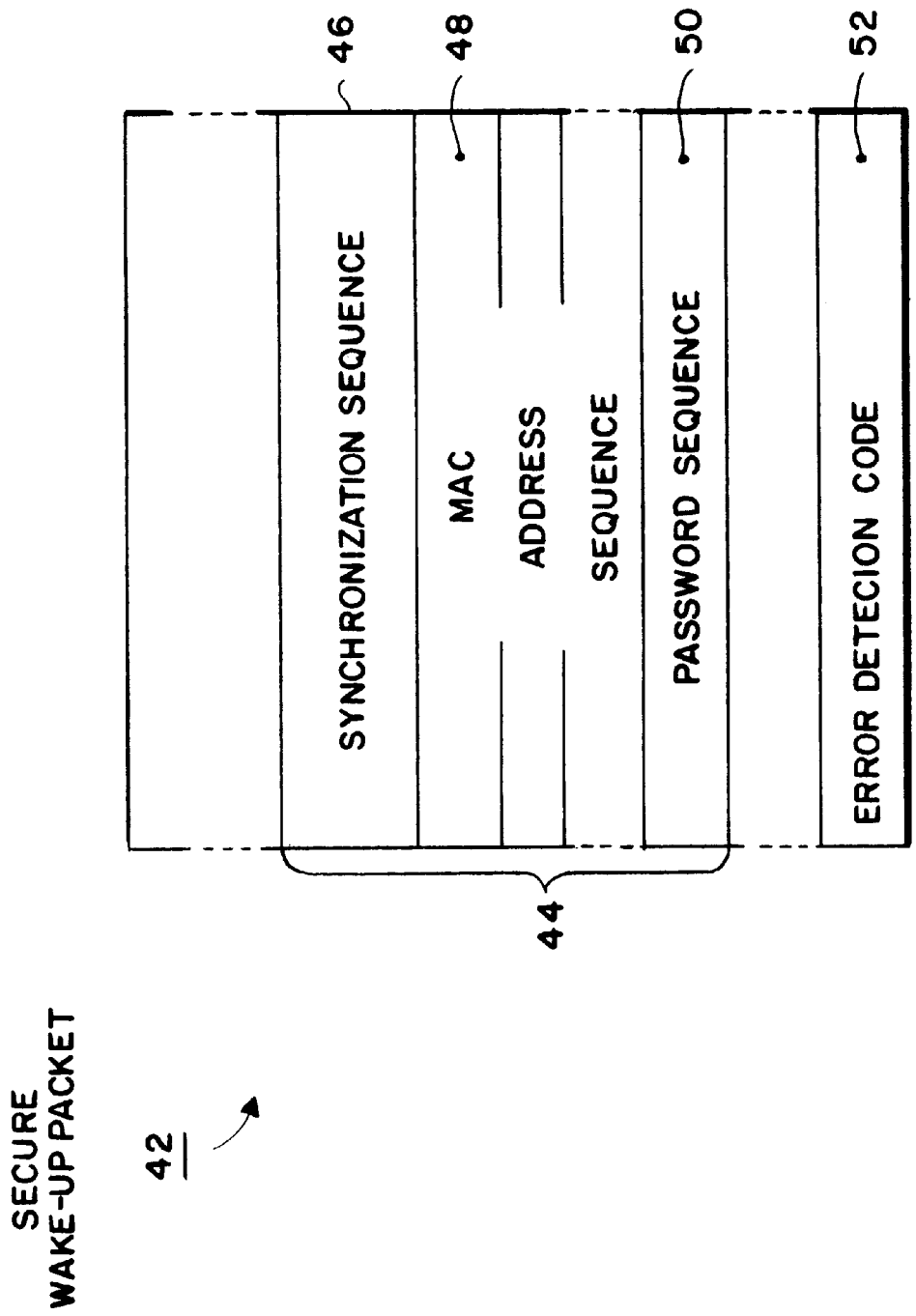
FIG. 4 is an illustration of a secure wake-up packet including a synchronization data sequence, a MAC address data sequence and a password data sequence.

FIG. 4 shows the data section of a secure wake-up packet 42 for remotely waking up a station such as the desktop computer 14. The secure wake-up packet 42 includes a portion 44 having a synchronization sequence 46, a MAC address sequence 48, and a password sequence 50. The portion 44 can be anywhere in the data section of the secure wake-up packet 42. Like the non-secure wake-up packet 32, an error detection code 52 is included at the end of the secure wake-up packet 42. The synchronization sequence 46, MAC address sequence 48 and error detection code 52 are analogous to their counterparts in the non-secure wake-up packet 32. A secure wake-up packet 42 with valid synchronization 46 and MAC address sequences 48 is a valid wake-up packet, but still may be an invalid secure wake-up packet. A valid secure wake-up packet also requires a valid password sequence 50.

The password sequence 50 follows the MAC address sequence 48 and has a predetermined relationship with a password required to wake up the desktop computer 14. In the preferred embodiment, the password sequence 50 contains six octets of data and needs to match the password required to wake up the system. For example, if the required password is ABh CDh EFh FEh DCh BAh, then the password sequence 50 must be ABh CDh EFh FEh DCh BAh. Other types of predetermined relationships between the password sequence 50 and the required password are virtually limitless. Some examples of other predetermined relationships include having the password sequence 50 be a certain number of repetitions of the required password; or an encrypted version of the required password; or a reversed order of the required password; or even combinations of such relationships. Such predetermined relationships could require longer or shorter password sequences 50 than the six octets of the preferred embodiment.

Using the MAC address of the non-secure wake-up packet 32 example, the portion 44 of an exemplary secure wake-up packet 42 directed to the desktop computer 14 requiring a password of ABh CDh EFh FEh DCh BAh would include the following:

FF FF FF FF FF FF 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06 01 02 03 04 05 06
01 02 03 04 05 06 01 02 03 04 05 06 AB CD EF FE DC BA.

Secure wake-up packets 42 can be developed to securely and remotely wake up multiple stations on the LAN 24. These secure wake-up packets 42 would include an appropriate portion like portion 44 for each intended station. Each appropriate portion would include the MAC address sequence 48 and password sequence 50 specifically needed for waking up the station targeted by that appropriate portion. The appropriate portions may immediately follow each other in the data section of the secure wake-up packet 42, or be separated by other data. Other implementations may omit repeating the synchronization sequence 46 for each appropriate portion beyond the first indication of the synchronization sequence 46 in the data section of the secure wake-up packet 42. Secure wake-up packets 42 for addressing multiple stations have only one error detection code 52, which appears at the end of the secure wake-up packet 42.

ELECTRICAL POWER STATES

Figure 5:
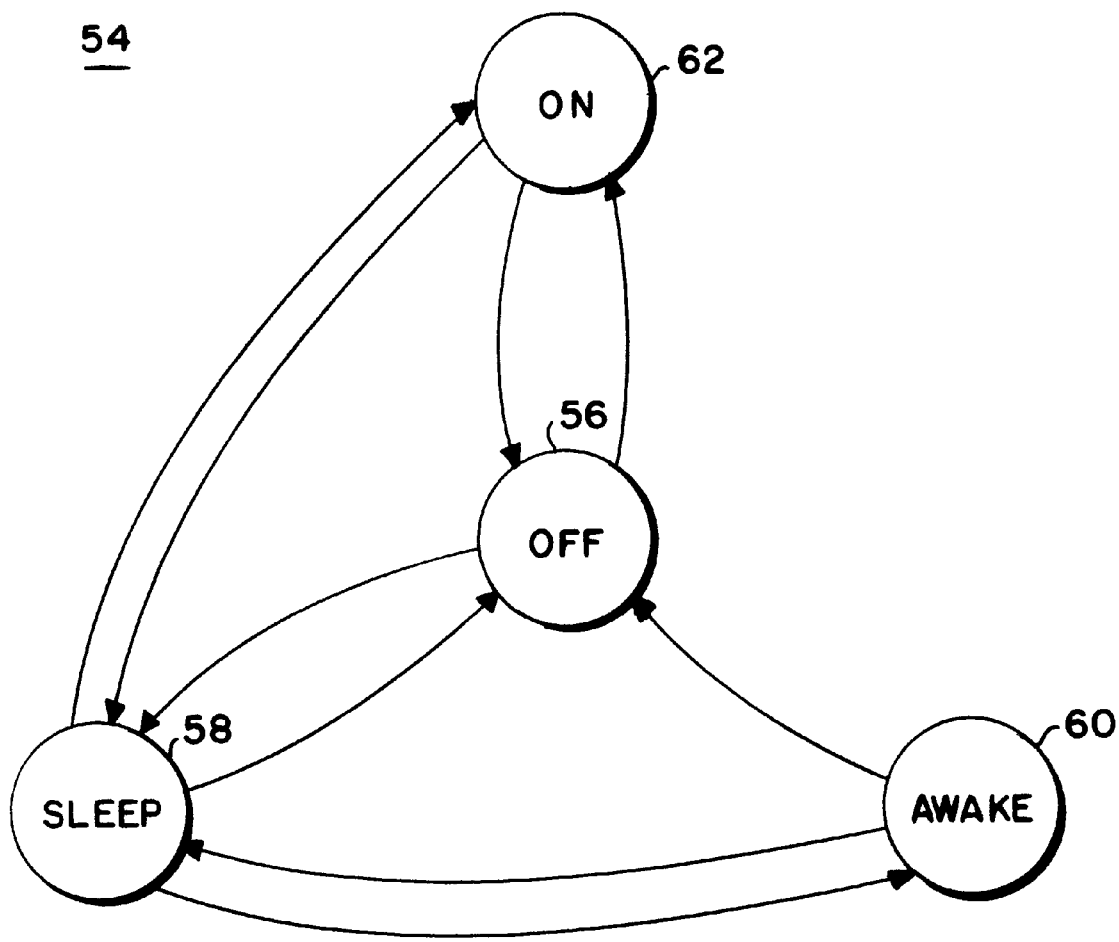
FIG. 5 is a state diagram showing the electrical power states of the desktop computer of FIG. 2.

FIG. 5 shows a state diagram 54 including four distinct electrical power states in which the desktop computer 14 is capable of operating. Each of the electrical power states represents an extent to which the desktop computer 14 is provided electrical power. The electrical power states include an OFF state 56, a SLEEP state 58, an AWAKE state 60 and an ON state 62.

In the OFF state 56, the desktop computer 14 is for the most part without electrical power, except for, perhaps, sufficient DC battery power to perform the most basic of functions such as maintaining a clock. The desktop computer 14 enters the OFF state 56 from any of the other power states 58–62 whenever the desktop computer 14 is disconnected from an electrical power source, such as when the desktop computer 14 is unplugged from an electrical outlet or when the electrical power source fails. Once electrical power is restored, the desktop computer 14 can return to the electrical power state in which it operated prior to the loss.

In the SLEEP state 58, electrical power is provided to a sufficient portion of the desktop computer 14 so that the desktop computer 14 is able to monitor network traffic on the communication link 26. According to the principles of the invention, it is while operating in the SLEEP state 58 that the desktop computer 14 can detect and examine wake-up packets addressed to the desktop computer 14. The desktop computer 14 enters the SLEEP state 58 from the AWAKE 60 upon the completion of a remote wake-up operation or from the ON state 62 when the desktop computer 14 is locally turned off (i.e., via a power switch on the computer 14).

In the AWAKE state 60, electrical power is provided to other portions of the desktop computer 14 so that the desktop computer 14 can execute basic computing operations, such as reading and writing to system firmware or memory. Still other portions of the desktop computer 14, for example, a display device or keyboard (not shown in the Figures), may remain without electrical power or be disabled. Implementations can vary as to how much of the desktop computer 14 remains disabled or without electrical power. In the preferred embodiment, the desktop computer 14 is not sufficiently functional to interact with a local user while operating in the AWAKE state 60 because the display device and the keyboard are disabled. The desktop computer 14 can even appear to be turned off.

To enter the AWAKE state 60, the desktop computer 14 must receive a valid non-secure or valid secure wake-up packet 32, 42 while operating in the SLEEP state 58. Because the valid wake-up packet 32, 42 wakes up the desktop computer 14, a network administrator is able to remotely access the desktop computer 14 with the desktop computer 14 maintaining an appearance of being turned off.

In the ON state 62, the desktop computer 14 is fully operational, both for remote and local usage. Electrical power is provided to every portion of the desktop computer 14 where the power is necessary to provide the full functional capabilities of the desktop computer 14. To enter the ON state 62, the desktop computer 14 is locally turned on while operating in the SLEEP state 58. Locally turning-on the desktop computer 14 entails pressing a power switch at the desktop computer 14 as described in more detail below. In an alternative embodiment, a valid wake-up packet 32 or 42 can cause the desktop computer 14 to enter the ON state 62 from the SLEEP state 58.

DESKTOP COMPUTER

Figure 6:
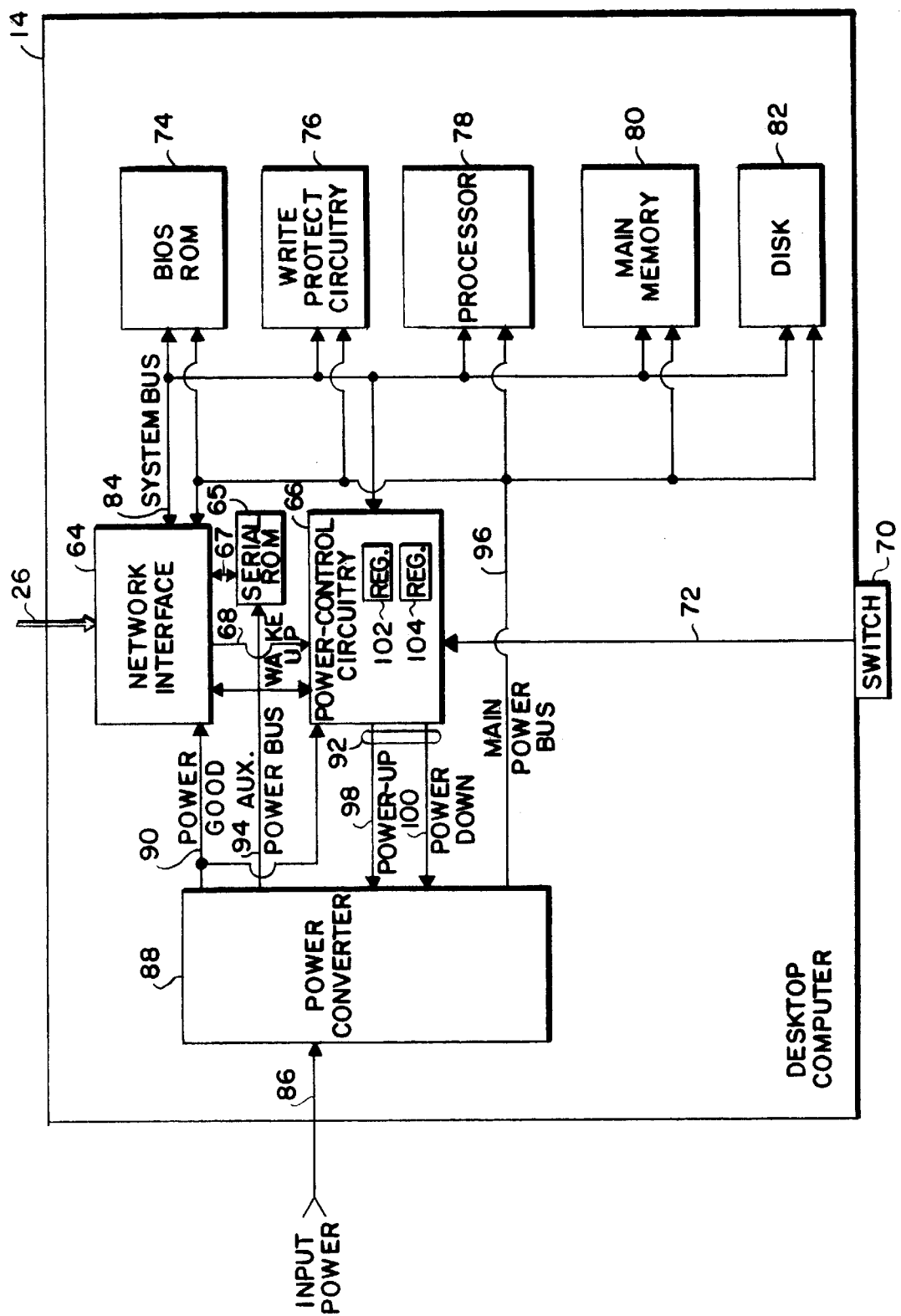
FIG. 6 is a functional diagram of the desktop computer shown in FIG. 2, including a network interface.

FIG. 6 shows the desktop computer 14 of FIG. 2 in more detail. The desktop computer 14 includes a network interface 64 that is coupled to the LAN 24 of FIG. 2 via the communication link 26. The network interface 64 is implemented as a single chip integrated circuit such as the 21143 network interface controller chip developed by Digital Equipment Corporation. Other implementations may similarly produce the functionality of the network interface 64 using multiple components.

The network interface 64, power-control circuitry 66, a serial non-volatile RAM (NVRAM) 65, a basic input/output system read-only memory (BIOS ROM) 74, write-protect circuitry 76, a processor 78, a main memory 80 and a disk 82 are connected by a system bus 84 upon which these components transmit and receive address, data and control signals.

The serial non-volatile memory (NVRAM) 65 is coupled to the network interface 64 by a dedicated serial line 67. The NVRAM 65 records any parameters that control the operation of the network interface 64. The NVRAM 65 also stores the MAC address of the desktop computer 14. In an alternative embodiment, the NVRAM 65 can be omitted from the desktop computer 14, and such information stored instead in the BIOS ROM 74.

The network interface 64 is connected to the power-control circuitry 66 by a signal line 68. A power switch 70 is connected to the power-control circuitry 66 by another signal line 72. The power switch 70 provides a signal on signal line 72 to the power-control circuitry 66 each time the power switch 70 is pressed.

The power-control circuitry 66 includes registers 102 and 104. The register 102 records the current electrical power state of the desktop computer 14. The register 104 records which component has signaled the power-control circuitry 66 to wake up the desktop computer 14.

As described further below, both the network interface 64 and the power switch 70 can each independently signal the power-control circuitry 66 to wake up the desktop computer 14. There may be other components in the desktop computer 14, in addition to the network interface 64 and the power switch 70, that can signal the desktop computer 14 to wake up. The register 104 has a single bit for each such component capable of providing such a wake-up signal. In the present illustration, the register 104 includes two bits, one for the network interface 64, the other for the power switch 70. The appropriate bit can be set high in response to a wake-up signal from the network interface 64 or the power switch 70. An alternative implementation may instead distribute the single bits of register 104 among several registers rather than only in the register 104. In still another implementation, the register 104 may be implemented in other components rather than in the power-control circuitry 66, such as in the network interface 64.

A power converter 88 couples input electrical power 86 to the network interface 64, the NVRAM 65 and the power-control circuitry 66 by an auxiliary power bus 94. The power converter 88 also selectively couples the input electrical power 86 to other portions of the desktop computer 14, such as the BIOS ROM 74, the write-protection circuitry 76, the processor 78, the main memory 80 and the disk 82 by a main power bus 96. Both the auxiliary power bus 94 and the main power bus 96 are connected to the network interface 64. The input electrical power 86 can be AC electrical power or DC battery power. The power converter 88 is also coupled to the network interface 64 by a control line 90 and to the power-control circuitry 66 by a bus 92.

The BIOS ROM 74 can be any of a variety of non-volatile memory devices that can be reprogrammed including electrically erasable read-only memory (EEPROM), or flash-erasable programmable read-only memory (FLASH). By way of example, the BIOS ROM 74 is a FLASH device. The BIOS ROM 74 contains the basic input/output system (BIOS) of the desktop computer 14. The BIOS includes the fundamental set of instructions and data for the particular architecture of the desktop computer 14, including details as to how data are to be presented to the processor 78.

The BIOS ROM 74 also contains a set-up program for selectively enabling or disabling the parameters that control the operation of the network interface 64. In the above-mentioned alternative embodiment wherein the NVRAM 65 is omitted, such operating parameters can instead be stored in the BIOS ROM 74.

The write-protection circuitry 76 determines whether the BIOS ROM 74 is in a protected or an unprotected state. A protected state is one wherein writes to the BIOS ROM 74 are prohibited, thereby preventing any alterations to contents of the BIOS ROM 74. Conversely, the contents of the BIOS ROM 74 can be altered when the BIOS ROM 74 is in the unprotected state.

The processor 78 may be a single-chip integrated circuit device with an associated instruction set and operating system. An example is the Pentium™ processor produced by Intel® Corporation.

The main memory 80 includes high-speed dynamic random access memories (DRAMs) for storing the instructions and data that constitute the operating system associated with the processor 78. The operating system includes computer programs which control the operation of the desktop computer 14 such as opening and closing files, sending files to a printer, and copying and deleting files. The disk 82 is a magnetic disk which serves as the initial storage for the operating system of the desktop computer 14.

Operation with respect to FIG. 6 is now described. Waking up the desktop computer 14 means providing electrical power to a particular portion of the desktop computer 14 so that the desktop computer 14 can bootstrap. Upon completion of the bootstrapping, the operating system is in control of the desktop computer 14. In the preferred embodiment, this particular portion of the desktop computer 14 includes the BIOS ROM 74, the processor 78, the main memory 80 and the disk 82. Examples of when the desktop computer 14 wakes up are when the electrical power state of the desktop computer 14 changes from the SLEEP state 58 to either the AWAKE 60 or ON state 62.

NETWORK INTERFACE

The network interface 64 is capable of operating in at least two modes: a standard mode and a remote access control mode. Whenever the desktop computer 14 is operating in either the AWAKE 60 or ON 62 state, the network interface 64 operates in the standard mode. In the standard mode, the network interface 64 processes network traffic on the LAN 24 like a conventional network interface.

The network interface 64 can operate in either the remote access control mode or the standard mode when the desktop computer 14 is in the SLEEP state 58. If configured in the remote access control mode, the network interface 64 monitors network traffic on the communication link 26 for wake-up packets 32, 42 addressed to the desktop computer 14, but if in the standard mode, the network interface 64 ignores the network traffic. Thus, remote wake-up of the desktop computer 14 can be deactivated by not operating the network interface 14 in remote access control mode when the computer 14 is in the SLEEP state 58.

When the network interface 64 is operating in the remote access control mode, the network interface 64 can also selectively provide two modes of remote access: non-secure mode and secure mode. In the non-secure mode, the network interface 64 issues a wake-up signal to the power-control circuitry 66 upon receiving a valid wake-up packet. This valid wake-up packet can be either a non-secure 32 or secure wake-up packet 42. In the secure remote access mode, the network interface 64 must receive a valid secure wake-up packet 42 in order to issue the wake-up signal. The flexibility of the network interface 64 to selectively provide secure and non-secure remote wake-up may provide backward compatibility with software that uses only the non-secure method of remote wake-up.

Figure 7:
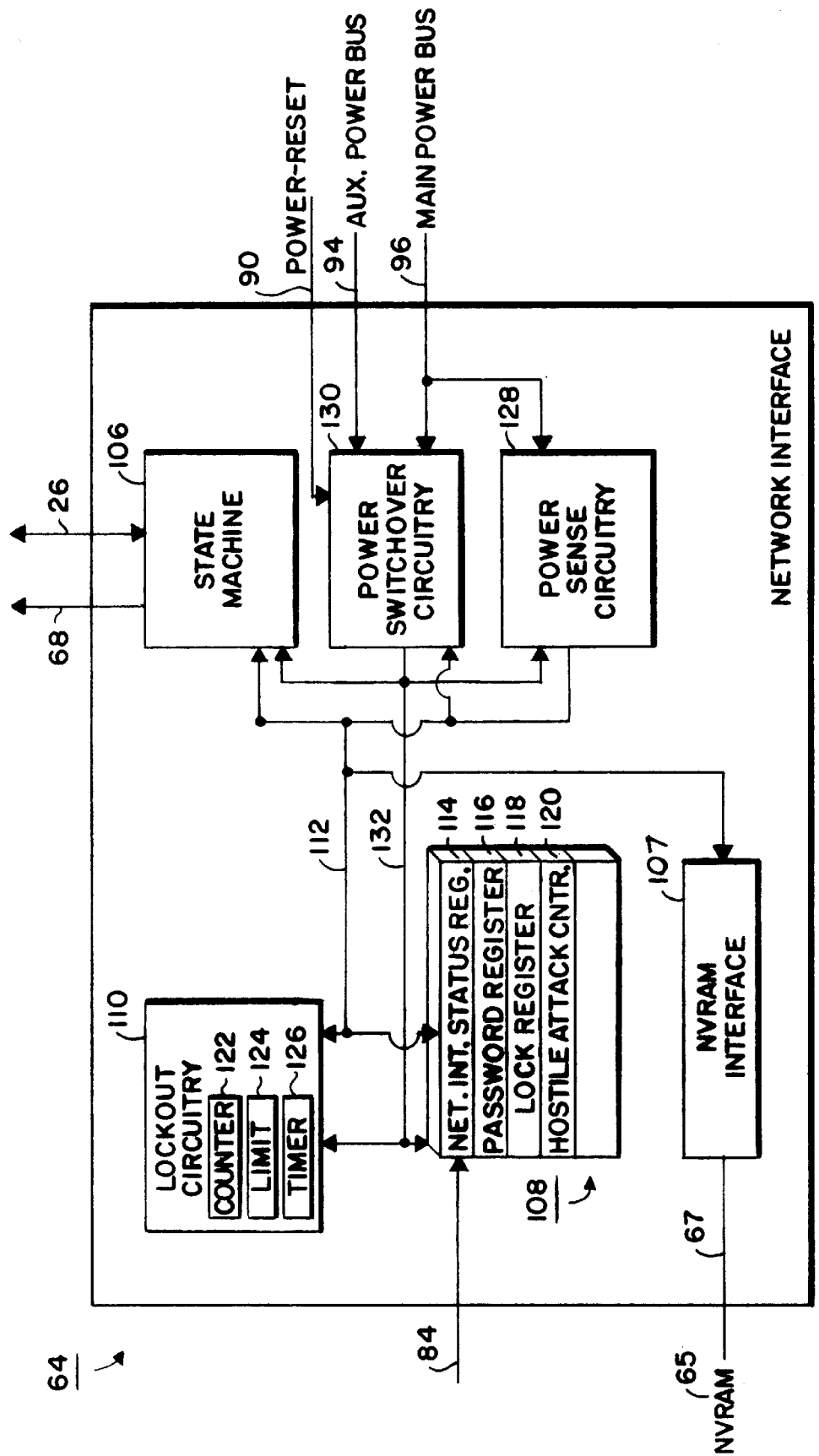
FIG. 7 is a functional diagram of the network interface of FIG. 6.

FIG. 7 shows the network interface 64 of FIG. 6 in greater detail. The network interface 64 includes a state machine 106, a VRAM interface 107, command and status registers 108, lockout circuitry 110 and power sense circuitry 128 connected to each other by a controller bus 112.

The state machine 106 is coupled to the LAN 24 by the communication link 26 and to the power-control circuitry 66 by signal line 68. The state machine 106 receives the wake-up packets on the communication link 26. The state machine 106 has access to the operating parameters of the network interface 64 and the MAC address stored in the NVRAM 65 through the NVRAM interface 107. The NVRAM interface 107 is coupled to the NVRAM 65 via the dedicated serial access line 67.

Command and status registers (CSRs) 108 include a network interface status register 114, a password register 116, a lock register 118 and a hostile attack counter 120. The CSRs 108 are coupled to the system bus 84. The network interface status register 114 is a two-bit register; one bit is used to indicate whether the network interface 64 is operating in the remote access control mode or the standard mode, and the other bit to indicate whether the mode of remote access is non-secure or secure.

The password register 116 stores a password required to wake up the desktop computer 14 when operating in secure remote access mode. The password is a randomly-generated forty-eight bit number, i.e., six octets long. A forty-eight bit value provides $281 \times 10^{12}$ possible unique passwords. Other implementations may provide for longer or shorter passwords. The password in the password register 116 cannot be read by any device external to the network interface 64. The state machine 106 has access to the password for comparing against the password sequences 50 of secure wake-up packets 42.

In the present illustration, the processor 78 executes software to produce a password. In another embodiment, the password can be generated at the workstation 12 and transmitted to the desktop computer 14 for storage. In such an embodiment, the workstation 12 should first encrypt the password to preserve the secrecy of the password during transmission. The desktop computer 14 can then either decrypt the password or store the password in the encrypted form.

Secure wake-up packets 42 must include a password sequence 50 that has a predetermined relationship to the password in the password register 116. A potential secure wake-up packet 42 may have valid synchronization and MAC address sequences 46, 48 and still be an invalid secure wake-up packet 42 because the potential secure wake-up packet lacked the password sequence 50 altogether or specified a password sequence 50 with an erroneous password.

The lock register 118 is a single bit register which indicates whether or not writes to the password register 116 are allowed. Locking out writes to the password register 116 prohibits unauthorized alteration of the password stored in the password register 116. Writes to other registers of the CSRs 108 may also be locked, depending upon the implementation of the network interface 64. If so, the lock register 118 can be modified to reflect the status of the other CSRs 108 as well. One simple exemplary modification is to increase the number of bits in the register 118 to accommodate any additional CSR 108 to be protected.

The hostile attack counter 120 can be an 8-bit register for maintaining a count of the hostile attacks processed by the state machine 106. In the computer industry, a hostile attack is an attempt to bypass the security mechanisms of the desktop computer 14. In the exemplary embodiment, each invalid secure wake-up packet 42 is considered to be a hostile attack and causes the hostile attack counter 120 to be incremented. An invalid secure wake-up packet 42 is a valid wake-up packet with valid synchronization and MAC address sequences 46, 48, but lacks a valid password sequence 50. (Packets that lack either a valid synchronization sequence 46 or a valid MAC address sequence 48 are, in fact, not valid wake-up packets, and, consequently, not seen by the state machine 106 to be attempts to wake up the desktop computer 14. Such packets do not affect the hostile attack counter 120.)

The lockout circuitry 110 includes a lockout counter 122 and a lockout timer 126 for limiting the frequency of hostile attacks upon the desktop computer 14. A purpose of the lockout circuitry 110 is to frustrate a hostile attacker who uses brute force tactics to breach the security of the desktop computer 14 by continuously submitting secure wake-up packets 42 which try all possible password combinations. The lockout circuitry 110 tolerates a specified number of invalid secure wake-up packets 42 before temporarily causing subsequently received packets, wake-up packets or otherwise, to be ignored.

The lockout counter 122 maintains a count of the number of hostile attacks for comparison with the specified number of tolerated invalid secure wake-up packets. For example, if four invalid secure remote access attempts are to be tolerated before subsequent attempts are locked out, a 2-bit counter can be used to implement the lockout counter 122. Another 2-bit counter may be used to implement a lockout limit register 124 for storing the maximum limit of tolerated attacks.

The lockout timer 126 maintains the lockout time for which packets arriving at the state machine 106 are to be ignored. The lockout timer 126 may be any simple timing device or a timing device that is responsive to the clock of the desktop computer 14 or may even be the clock of the desktop computer 14. The lockout time is specified so as to limit the frequency at which invalid secure wake-up packets 42 can be processed by the state machine 106. By limiting the permissible rate of wake-up attempts, the lockout circuitry 110 makes it highly unlikely that attempts to breach the security of the desktop computer 14 will succeed. For example, predetermining the lockout limit register 124 and the lockout timer 126 so as to tolerate 535 attacks per minute means that a brute force hostile attack would have to be sustained for one year just to have a one in a million chance of succeeding. (535 attacks/minute*525600 minutes/year= $281 \times 10^6$ attacks per year, which is one-millionth the number of possible passwords.) Once the lockout time has expired, the lockout counter 122 can be reset to zero. Other embodiments can use different criteria to reset the lockout counter 122 to zero, such as waiting until a valid secure wake-up packet 42 is received or until a period has elapsed during which no invalid secure wake-up packets 42 are received. Such implementations would even further offset the concentrated nature of brute force attacks by having every subsequent invalid secure wake-up packet 42 beyond the limit in the lockout limit register 124 initiate another temporary lockout.

The power sense circuitry 128 is coupled to the main power bus 96. The power sense circuitry 128 detects when the electrical power supplied by the main power bus 96 drops below 1 volt from a nominal voltage level (e.g., 3.3 volts), and subsequently signals the state machine 106 and the power switchover circuitry 130 on controller bus 112.

The power switchover circuitry 130 is coupled to the power converter 88 for receiving the power-reset signal on control line 90 and electrical power from the auxiliary 94 and main 96 power busses. The power switchover circuitry 130 controls the source of electrical power for the components 106, 108, 110, 128 of the network interface 64 and distributes the electrical power on supply line 132.

The power switchover circuitry 130 distributes electrical power provided on the auxiliary power bus 94 when the desktop computer 14 is operating in the SLEEP state 58. Upon receiving a power reset signal 90, the power switchover circuitry switches to distributing electrical power provided on the main power bus 96. The power switchover circuitry 130 returns to distributing the electrical power provided on the auxiliary power bus 94 in response to receiving a signal from the power sense circuitry 128 on the controller bus 112 that the electrical power on the main power bus has dropped below 1 volt.

Figure 8:
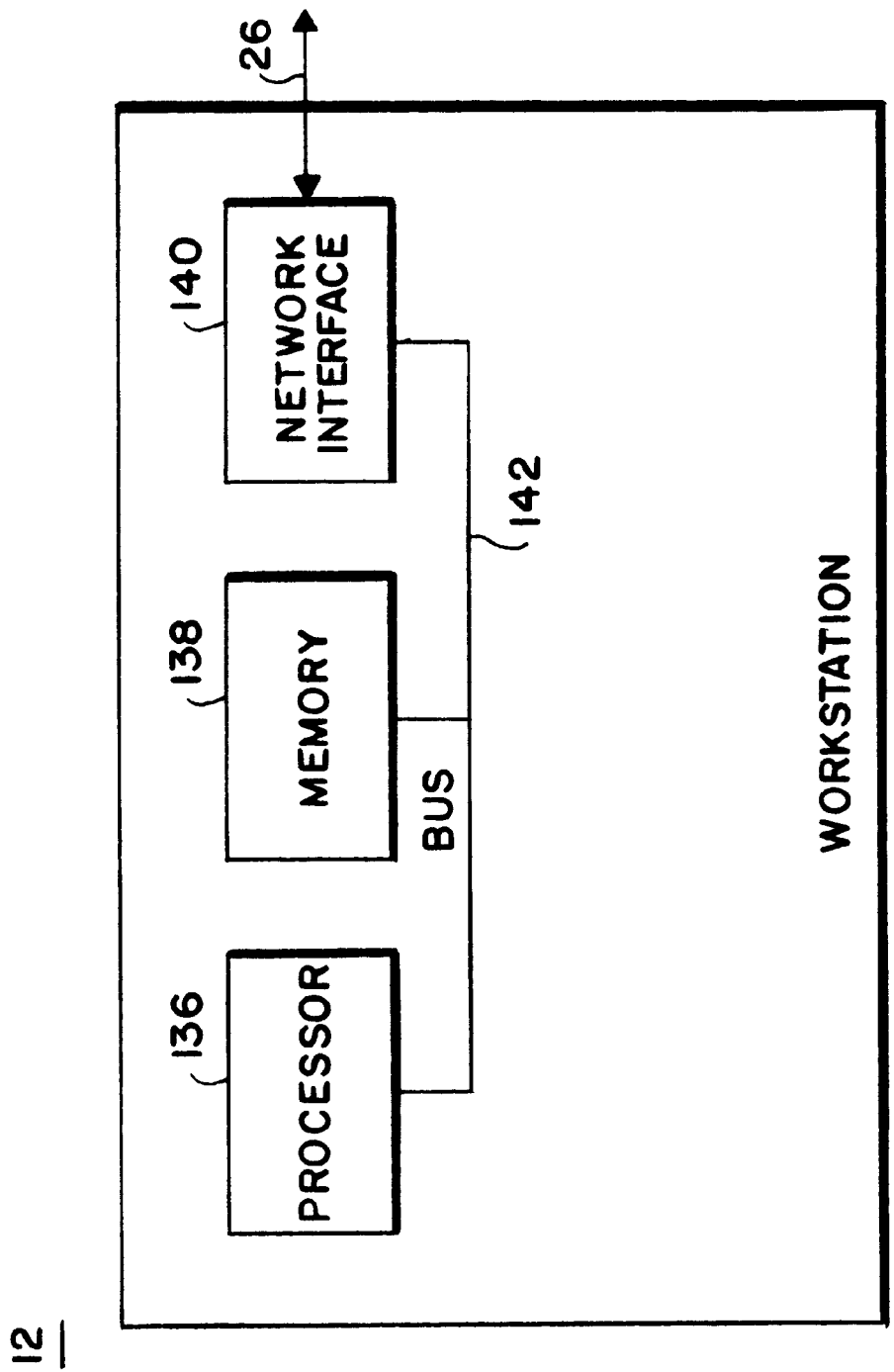
FIG. 8 is block diagram of the workstation in FIG. 2.

FIG. 8 shows workstation 12 of FIG. 2 in more detail. For purposes of illustration, the workstation 12 is being used as an exemplary remote management console to demonstrate the principles of the invention. Any station capable of generating and transmitting a wake-up packet to another station, such as the desktop computer 14, can serve the same purpose. The administration of resources on the LAN 24 can be remotely managed from the workstation 12.

The workstation 12 includes a processor 136, a memory 138 and a network interface 140 connected to each other by a bus 142. The processor 136 may be a single-chip integrated circuit device with an associated instruction set and operating system. The memory 138 may be comprised of high-speed dynamic random access memories (DRAMs) for storing instructions and data. The data includes new and old passwords required to wake up the desktop computer 14 and associations between such passwords and the MAC address of the desktop computer 14. The instructions comprise application software which access the data to generate and transmit wake-up packets to the desktop computer 14 over the network.

The network interface 140 of the workstation 12 interfaces the LAN 24 by communication link 26 by which the network interface 140 transmits and receives packets from stations on or external to the LAN 24.

Operation is now described in connection with FIGS. 3–8. As previously discussed, the desktop computer 14 can operate in any one of at least four electrical power states 56–62.

SLEEP STATE OPERATION

When the desktop computer 14 is operating in the SLEEP state 58, the power converter 88 provides input electrical power 86 to the network interface 64, the NVRAM 65, and the power-control circuitry 66 by an auxiliary power bus 94. The other portions of the desktop computer 14, such as the BIOS ROM 74, write protect circuitry 76, processor 78, main memory 80 and disk 82, are without electrical power. Consequently, the network interface 64 is able to detect and process wake-up packets on the communication link 26 while much of the desktop computer 14 is without electrical power.

In the preferred embodiment, the network interface 64 must be operating in the remote access control mode in order to detect wake-up packets. In the SLEEP state 58, packets received when the network interface 64 is not in the remote access control mode are ignored.

When the network interface 64 is in remote access control mode, the state machine 106 examines the destination field of the packet header for an Ethernet™ broadcast address or the MAC address of the desktop computer 14. The state machine 106 references the MAC address of the desktop computer 14 stored in the NVRAM 65 to evaluate the destination address. The state machine 106 further scans packets addressed to the desktop computer 14 to determine the packet type. Packets that have a valid synchronization sequence 36, 46 and a valid MAC address sequence 38, 48 are considered to be potential wake-up packets. Packets lacking either a valid synchronization 36, 46 or MAC address sequence 38, 48 are discarded.

The state machine 106 considers any received potential wake-up packet to be an attempt to remotely wake up the desktop computer 14. The state machine 106 determines from the network interface status register 114 whether the network interface 64 is in non-secure or secure remote access mode. When the network interface 64 is providing non-secure remote access, valid synchronization 36, 46 and MAC address sequences 38, 48 are sufficient to wake up the desktop computer 14. Thus, the state machine 106 then issues the wake-up signal on signal line 68 to the power-control circuitry 66.

If instead the network interface 64 is providing secure remote access, then the state machine 106 further scans the data portion of the wake-up packet for a password sequence 50 that has a predetermined relationship to the password stored in the password register 116. If the predetermined relationship is found, then the state machine 106 issues the wake-up signal on signal line 68 indicating that the network interface 64 has received a valid secure wake-up packet 42.

In the event the potential wake-up packet lacks a password sequence 50 or the password sequence 50 does not have the predetermined relationship to the password stored in the password register 116, such potential wake-up packet is deemed to be a hostile attack upon the desktop computer 14, and the hostile attack counter 120 and the lockout counter 122 are incremented.

Should the count in the lockout counter 122 reach the predetermined limit, the lockout circuitry 110 temporarily disables the state machine 106 from processing any more packets for a predetermined lockout time. When the lockout time expires, the state machine 106 can again process subsequently received packets. The lockout circuitry 110 resets the lockout counter 122 to 0. The lockout counter 122 may also be reset to 0 whenever a predetermined period of time has elapsed wherein no invalid secure wake-up packets 42 have been processed by the state machine 106. In other words, although the count in the lockout counter 122 has not yet reached the predetermined limit so as to start the lockout timer 126, the count may be reset to 0 after a specified quiet period with no hostile attacks. Another timer (not shown in FIG. 7) of the network interface 64 may be used to measure such quiet periods devoid of hostile attacks. This will cancel any improper incrementing of the lockout counter 122 that is caused by spurious data on the communication link 26.

Two ways for waking up the desktop computer 14 are hereinafter described.

THE LOCAL POWER SWITCH

Locally pressing the power switch 70 at the desktop computer 14 when the desktop computer 14 is operating in the SLEEP state 58 wakes up the desktop computer 14. Pressing the power switch 70 signals to the power-control circuitry 66 on signal line 72 to provide electrical power to other portions of the desktop computer 14. In this instance, waking up the desktop computer 14 results in changing the electrical power state in which the computer 14 operates from the SLEEP 58 to the ON state 62.

SENDING A WAKE-UP PACKET

Sending an appropriate valid wake-up packet to the network interface 64 operating in remote access control mode also wakes up the desktop computer 14 according to the principles of the invention. In response to the appropriate wake-up packet, the network interface sends a wake-up signal to the power-control circuitry 66. In this instance, waking up the desktop computer 14 results in changing the electrical power state from the SLEEP 58 to the AWAKE state 60. As mentioned above, in an alternative embodiment, the wake-up packet can instead be used to cause the desktop computer 14 to enter the ON state 62.

Thus both the power switch 70 and the network interface 64 can produce a signal that causes the power-control circuitry 66 to wake up the desktop computer 14. In response to a wake-up signal from either the power switch 70 or the network interface 64, the power-control circuitry 66 provides a power-up signal 98 to the power converter 88 via bus 92. Also, the appropriate bit in the register 104 is set to indicate which component 64, 70 has signaled for the wake-up, and the contents of the register 102 are set to reflect the electrical power state of the desktop computer 14.

The power converter 88, in response to the power-up signal 98, supplies electrical power to other portions of the desktop computer 14, such as the BIOS ROM 74, the write-protection circuitry 76, the processor 78, the main memory 80 and the disk 82, by the main power bus 96. The main power bus 96 also carries main electrical power to the network interface 64.

Once the main electrical power on the main power bus 96 is stable, the power converter 88 sends a power-reset signal to the network interface 64 on a control line 90. The power switchover circuitry 130 of the network interface 64 receives the power-reset signal and switches over the supply 132 of electrical power for the network interface 64 from the electrical power provided on auxiliary power bus 94 to the electrical power on the main power bus 96. The state machine 106 also unlocks the password register 116 and changes the lock register 118 accordingly.

In the case where the network interface 64 is operating in the remote access control mode, the power-reset signal also causes the network interface 64 to exit the remote access control mode. As a result, the network interface 64 handles subsequent wake-up packets as normal network traffic, and not as wake-up packets, for as long as the desktop computer 14 remains operating in either the AWAKE 60 or ON states 62.

A result of distributing electrical power to the other portions 74–82 of the desktop computer 14 is to initiate a bootstrap sequence. The processor 78 then performs the bootstrapping operations of the desktop computer 14 by executing instructions stored in the BIOS ROM 74. Because main memory 80 usually provides faster access to data than BIOS ROM 74, the BIOS is copied into and executed from the main memory 80. A copy of the BIOS can also be stored on disk 82.

Typical bootstrap operations include checking the keyboard connection, testing the main memory 80 and performing other diagnostics. A bootstrap sequence may implement security features that require local entry of a user or administrator password before bootstrapping of the desktop computer 14 can continue. The BIOS ROM 74 instructions direct the processor 78 to examine the register 104 to determine the source initiating the wake-up of the desktop computer 14. If the power switch 70 is that source, the bootstrapping includes performing the security features.

Also, at a point in the bootstrap sequence, the bootstrapping pauses to allow selective execution of the set-up program. Execution of the set-up program begins by clicking an input device or pressing a particular key on the keyboard during this pause. A locally-entered password may be required to continue execution. The set-up program is used to select whether the network interface 64 is to operate in remote access control mode, and, if so, whether in non-secure or secure mode. The selected operating mode is subsequently stored in the NVRAM 65. In the alternative embodiment without the NVRAM 65, the operating mode can be stored in another non-volatile memory, such as the BIOS ROM 74.

If instead the network interface 64 initiated the wake-up, then those BIOS ROM 74 instructions that perform these local user and administrative security features are bypassed. This avoids suspending the bootstrapping sequence while awaiting local entry of an user password. Since the station that sent the wake-up packet to the network interface 64 to initiate the wake-up may be physically remote from the desktop computer 14, local entry of the password may be impractical. Also, the processor 78 can then execute BIOS instructions that ignore or disable user inputs from local input devices such as the keyboard or mouse before the operating system gains control of the desktop computer 14. As a result, no one physically present at the desktop computer 14 should be able to obtain supply inputs to the desktop computer 14 while a remote wake-up operation is in progress.

During the initial configuration of the desktop computer 14, another bootstrap operation stores the MAC address of the desktop computer 14 in the NVRAM 65 for persistent storage. Once the MAC address is stored in the NVRAM 65, this operation need not be performed in subsequent bootstraps of the computer 14. In the alternative embodiment wherein the NVRAM 65 is omitted, this operation can store the MAC address elsewhere in the network interface 64 such as in a CSR 108.

After the execution of such bootstrap operations, the BIOS instructions then direct the processor 78 to copy the operating system from the disk 82 into the main memory 80 and to continue the bootstrapping by executing the operating system instructions. Thus, the operating system gains control of the operations of the desktop computer 14. The operating system maintains control of the desktop computer 14 until electrical power is removed from the main power bus 96.

Once the desktop computer 14 is in the AWAKE state 60 or ON state 62, the network interface 64 exits the remote access control mode, if so configured, and operates in the standard operating mode for as long as the desktop computer 14 is in the AWAKE 60 or ON state 62. Thus, the network interface 64 no longer handles subsequently received wake-up packets as wake-up packets, but rather as normal network traffic.

Two ways of placing the desktop computer 14 into the SLEEP state 58 are described below.

PRESSING THE POWER SWITCH

Pressing the power switch 70 when the desktop computer 14 is in the ON state 62 sends a signal on signal line 72 to the power-control circuitry 66 that changes the data stored in the register 102 to reflect the SLEEP state 58. In response, the desktop computer 14 enters the SLEEP state 58.

COMPLETING THE REMOTE WAKE-UP OPERATION

The second is accomplished upon completing the remote wake-up operation. Various techniques may be used to indicate the termination of the remote wake-up operation. One technique is to send a particular message to the network interface 64 indicating that the remote wake-up operation is complete. Another is to use a particular period of inactivity between the station that sent the wake-up packet and the desktop computer 14 to terminate the remote wake-up operation.

Whether on account of the power switch 70 or the termination of the remote wake-up operation, the processor 78 executes a power-down sequence. The instructions for performing the power-down sequence can be from either the BIOS or the operating system or both. The power-down sequence causes a power-down signal to be sent to the power-control circuitry 66 on the system bus 84. The power-control circuitry 66 then issues a power-down signal 100 on bus 92 to the power converter 88 to turn off the electrical power on the main power bus 96.

When the power converter 88 ceases supplying electrical power on the main power bus 96, the power sense circuitry 128 senses when the electrical power on the main power bus 96 falls below 1 volt and accordingly signals the state machine 106 and power switchover circuitry 130 on the controller bus 112. The state machine 106 responds to this notice of power loss from the main power bus 96 by copying the operating mode of the network interface 64 from the NVRAM 65 into the network interface status register 114. Thus, the network interface 64 is automatically configured to operate in remote access control mode when the desktop computer 14 enters the SLEEP state 58, if in fact this was the selected and stored operating mode. Also, the power switchover circuitry 130 switches back to distributing the electrical power on auxiliary power bus 94. In the alternative embodiment wherein the NVRAM 65 is omitted from the desktop computer 14, the operating mode is instead obtained from the BIOS ROM 74.

POWER FAILURE

Loss of input electrical power 86 to the desktop computer 14 causes the desktop computer 14 to enter the OFF state 56. This power failure may occur while the desktop computer is operating in any of the other electrical power states 58–62. Without electrical power, the network interface 64 loses any programmed configuration data, such as the operating mode and other network parameters. Non-volatile memory, however, such as the NVRAM 65 and the BIOS ROM 74, maintain their data.

With the restoration of input electrical power 86 to the desktop computer 14 (and the network interface 64), the desktop computer 14 reconfigures the network interface 64 according to the operating mode in which the network interface 64 was operating prior to the power failure. In the present embodiment, the state machine 106 reads the operating mode (and other parameters) from the NVRAM 65 over the bus 67 and copies the operating mode into the appropriate CSRs 108, for instance, the operating mode is restored to the network status register 114. In this manner the network interface 64 can be reconfigured for the remote access control mode without having to supply electrical power on the main power bus 96 and executing additional BIOS or operating system software.

In the alternative embodiment without the NVRAM 65, in which the operating mode of the network interface 64 was stored in the BIOS ROM 74, it is necessary for the power converter 88 to supply electrical power on the main power bus 96 so that the processor 78 can execute BIOS or operating system software that reconfigures the network interface 64 according to the operating mode.

If the desktop computer 14 was in the SLEEP state 58 at the time of the power failure, the desktop computer 14 returns to the SLEEP state 58 after the operating mode and other operating parameters are copied from the NVRAM 65 to the CSRs 108. Optionally, the operating mode and parameters can be copied from the BIOS ROM 74. Thus, the network interface 64 is configured with the appropriate operating mode for when the desktop computer 14 is operating in the SLEEP state 58. If instead the desktop computer 14 was in the AWAKE 60 or ON state 62 prior to the power failure, the desktop computer 14 is allowed to bootstrap, as described above, and enter the ON state 62.

Figure 9:
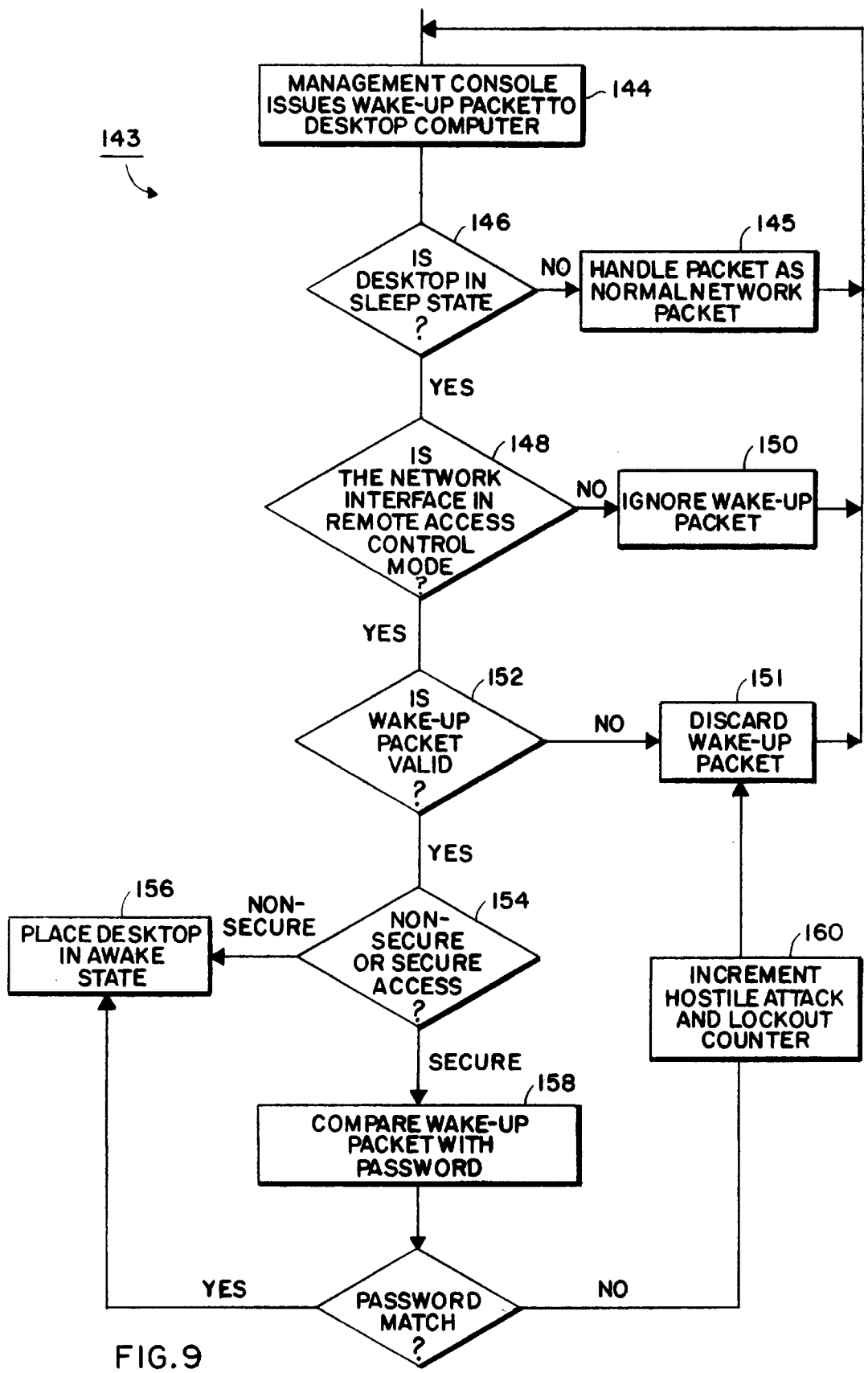
FIG. 9 is a flow chart depicting the operation of the desktop computer of FIG. 4 and the workstation of FIG. 8 during a remote wake-up operation.

FIG. 9 shows a flow chart 143 illustrating an exemplary method by which the workstation 12, acting as a remote management console, remotely wakes up the desktop computer 14 over the LAN 24.

In step 144, the workstation 12 generates and issues either a non-secure 32 or secure 42 wake-up packet on communication link 26 intended for the desktop computer 14.

Note that in the course of transmitting a secure wake-up packet 42 over the LAN 24, the workstation 12 may compromise the secrecy of the password required to wake up the desktop computer 14 if the workstation 12 does not encrypt the password sequence 50. This exposes the password sequence 50 to unauthorized reading by sophisticated eavesdroppers. This exposure is countered, however, by generating a new password each time the desktop computer 14 is awakened, as described in connection with FIG. 10 below. Hence, although an unauthorized user may eavesdrop on a secure wake-up packet 42 and steal the password sequence 50, once the secure wake-up packet 42 causes the desktop computer 14 to wake-up, a new password is produced and the stolen password sequence 50 is rendered useless.

In step 146, if the desktop computer is not in the SLEEP state 58, but rather in the AWAKE 60 or ON state 62, the wake-up packet 32 or 42 is handled as normal network traffic rather than as a wake-up packet (step 145).

When the desktop computer 14 is operating in the SLEEP state 58, the network interface 64 detects and processes the wake-up packet 32 or 42 if it is operating in the remote access control mode (step 148). Otherwise, the wake-up packet 32 or 42 is ignored (step 150).

When operating in remote access control mode, the network interface 64 determines whether the wake-up packet 32 or 42 qualifies as a valid wake-up packet (step 152). The header of the wake-up packet 32 or 42 must comply with the requirements of the LAN 24 by indicating the source address, the destination address or broadcast address, and proper error detection code. The network interface 64 scans the data portion of the wake-up packet 32 or 42 for the synchronization sequence 36 or 46 followed by sixteen successive repetitions of the MAC address of the desktop computer 14. The network interface 64 subsequently discards the wake-up packet 32 or 42 if it fails in any of the above-mentioned respects (step 151).

Once the network interface 64 determines that a potential wake-up packet 32 or 42 has been received, the network interface status register 114 indicates whether the network interface 64 is providing non-secure or secure remote access (step 154). The network interface 64 issues a wake-up signal to the power-control circuitry 66 to wake up the desktop computer 14 if the network interface 64 is providing non-secure remote access (step 156). If the network interface 64 is providing secure remote access, the network interface 64 compares the six octets of data immediately following the MAC address sequence 46 in the data section of the wake-up packet 32 or 42 with the password stored in the password register 116 (step 158). If the six octets match the password in the password register 116, the network interface 64 issues a wake-up signal to the power-control circuitry 66 to wake up the desktop computer 14 (step 156). Otherwise, the network interface 64 increments the hostile attack counter 120 and the lockout counter 122 (step 160), and subsequently discards the wake-up packet 32 or 42 (step 151).

Figure 10:
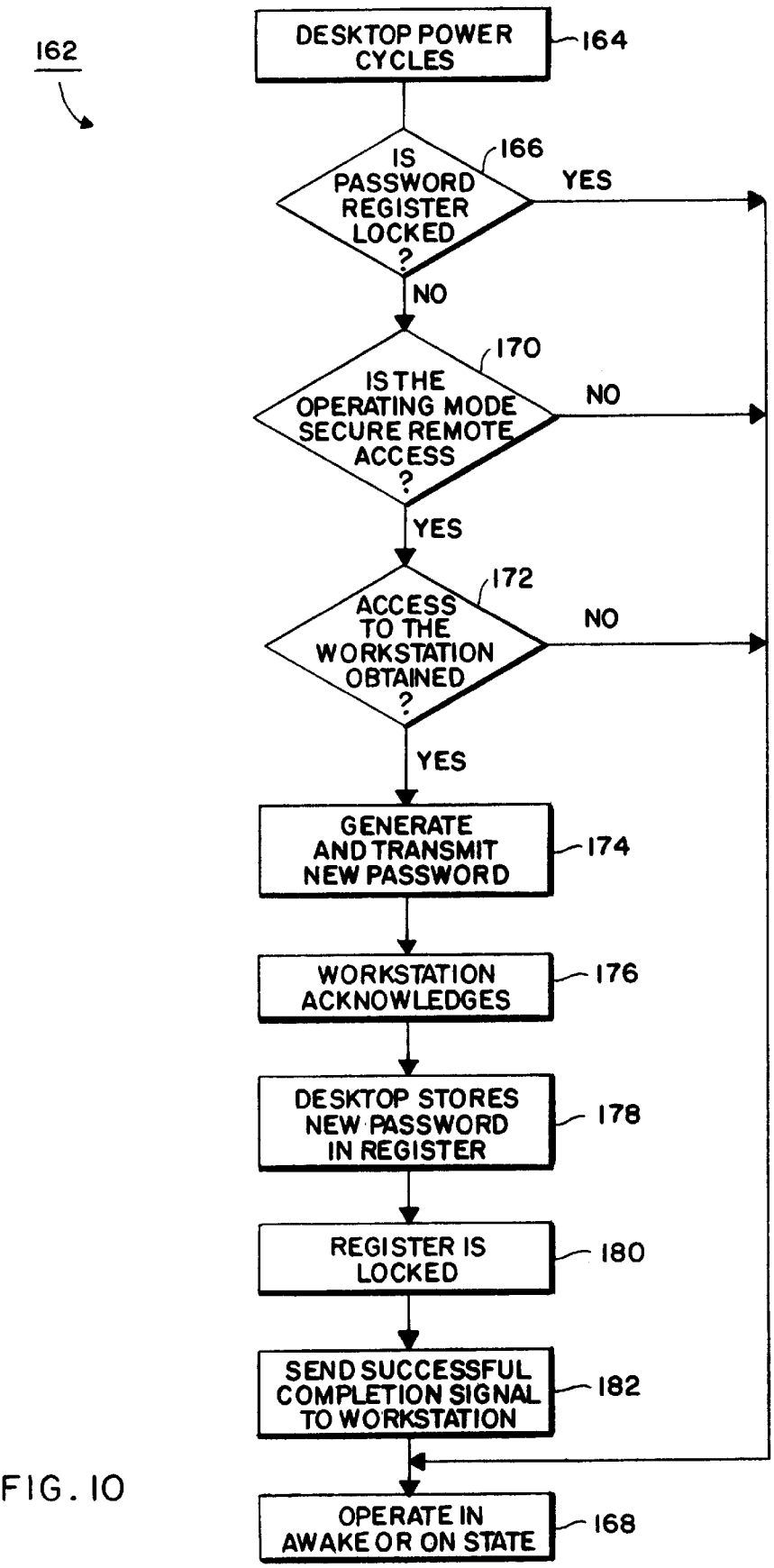
FIG. 10 is a flow chart depicting the operations between desktop computer of FIG. 4 and the workstation of FIG. 8 during the generation of a new password for secure remote wake-up.

FIG. 10 shows a flow chart 162 illustrating an exemplary method by which passwords are generated for use during secure remote accesses by the workstation 12 to the desktop computer 14. The desktop computer 14 attempts to generate a new password upon each completion of a power cycle by the desktop computer 14. In the present illustrated embodiment, a power cycle completes when the main power bus 96 changes from not supplying to supplying electrical power. Said another way, a power cycle completes each time the desktop computer 14 transitions from either the OFF 56 or SLEEP 58 state to either the AWAKE state 60 or ON 62 state (step 164). Either way, components 74–82 coupled to the main power bus 96 go from being without electrical power to receiving electrical power.

In step 166, the processor 78 determines whether the password register 116 is locked. A locked password register 116 indicates that the password stored therein has not yet been compromised. (As previously mentioned, receiving a secure wake-up packet 42 in which the password sequence 50 was not encrypted would compromise the password.) A reason for the password register 116 to still be locked is because a re-boot of the desktop computer 14 was initiated locally on the keyboard of the desktop computer 14. Thus, a new password does not need to be generated and the password generation ends, leaving the desktop computer 14 to operate in either the AWAKE 38 or ON state 62 (step 168). On the other hand, an unlocked password register 116 indicates a wake-up of the desktop computer 14 has occurred and a new password needs to be generated.

In step 170, it is determined whether the network interface 64 is even configured to operate in the secure remote access for when the desktop computer 14 enters the SLEEP state 58. If not, a new password is unnecessary.

In step 172, the desktop computer 14 attempts to communicate with the workstation 12 over the LAN 24. It is critical for the purposes of remote wake-up operations that each newly generated password be communicated between the workstation 12 and the desktop computer 14. Hence, if such communication cannot be established, then the new password is not generated at this time. For example, when the desktop computer 14 is first added to the LAN 24, the first time the desktop computer 14 is plugged into an electrical outlet and turned on, via the power switch 70, the desktop computer 14 attempts to generate a password. However, at this time the desktop computer 14 lacks sufficient data about other stations on the LAN 24, particularly the workstation 12 to which it must transmit any generated password. Thus, communication with the workstation 12 is not established, and the password generation ends. However, the desktop computer 14 remains on the LAN 24 and is able to learn the necessary network information in preparation for a subsequent power cycle.

In step 174, the processor 78 executes software that randomly generates a new password. The new password is encrypted and sent by the desktop computer 14 to the workstation 12. The new password is encrypted before being transmitted to the workstation 14 to preserve the secrecy of the new password during transmission over the LAN 24.

In step 176, the workstation 12 receives and decrypts the new password, and acknowledges receipt of the new password to the desktop computer 14.

The desktop computer 14 receives the acknowledgment from the workstation 12, and, in response, stores (step 178) and locks (step 180) the new password in the password register 116. The lock register 118 is changed to indicate that the password is locked. When the password register 116 is locked, the network interface 64 ignores attempts by unauthorized software to disable secure remote access through the network interface status register 114 or the BIOS ROM 74. This thwarts any attempts to bypass the password requirement of secure remote access by simply altering the status of the network interface 64 to provide non-secure remote access. This also prevents read and write access to the password register 116.

In step 182, the desktop computer 14 sends a signal to the workstation 12 indicating that the storing and locking of the new password was successfully completed.

The old password remains in effect until the step 178 of storing the new password in the password register 116 is successfully completed. If step 182 does not successfully complete there is uncertainty at the workstation 12 as to which password, the old or the new, is in effect. However, since the workstation 12 retains both the old and new passwords, both can be used in successive secure remote access attempts to determine which is the true password.

Should for any reason the password become unknown to the workstation 12, the ability of the workstation 12 to remotely wake up the desktop computer 14 is only temporarily lost. The desktop computer 14 merely needs to undergo another power cycle in order to initiate the generation of a new password. This can be done by locally turning the desktop computer 14 off and on again via the power switch 70. This induces the process described in FIG. 10, which synchronizes the newly generated password between the system receiving the packet and the system sending the packet.

For the purpose of illustration, FIG. 10 shows the desktop computer 14 generating and sending the new password to the workstation 12 over the network. In an alternative implementation, the workstation 12 can generate and send the password to the desktop computer 14.

It is to be understood that the above-described embodiments are simply illustrative of the principles of the invention. Various other modifications and changes may be made by those skilled in the art which will embody the principles of the invention and fall within the spirit and the scope thereof.

What is claimed is:

1. A method for remotely waking up a processor-based system over a network, comprising the steps of:

detecting a packet of data addressed to the system;

determining whether the packet of data has a particular data sequence including a password sequence having a predetermined relationship with a password required to wake up the system; and providing electrical power to the system to wake up the system in response to determining that the packet of data has the particular data sequence.

2. The method according to claim 1 wherein the step of providing electrical power to the system to wake up the system enables communication between a station coupled to the network and operating system software of the system.

3. The method according to claim 1 wherein the processor-based system is a computer and further comprising the step of executing software to bootstrap the computer in response to providing electrical power to the computer.

4. The method according to claim 1, further comprising the steps of:

generating a new password for waking up the system;

transmitting the new password over the network; and storing the new password in the system.

5. The method according to claim 4, further comprising the step of encrypting the new password before transmitting the new password.

6. The method according to claim 4, further comprising the step of receiving an acknowledgment from a second system receiving the new password; and wherein the step of storing the new password operates in response to receiving the acknowledgment.

7. The method according to claim 4, wherein the system is a first system, the step of generating the new password is performed by the first system; and the step of transmitting the new password operates to transmit the new password from the first system to a second system coupled to the network.

8. The method according to claim 4, wherein the system is a first system, the step of generating the new password is performed by a second system coupled to the network; and the step of transmitting the new password operates to transmit the new password from the second system to the first system.

9. The method according to claim 4, wherein the steps of generating, transmitting and storing of a new password are repeated each time electrical power is supplied to the system to wake up the system.

10. The method according to claim 1, further comprising the steps of:

removing electrical power from all but a portion of the system;

detecting when electrical power is being removed from the all but the portion of the system; and configuring the portion of the system to operate in a mode capable of detecting packets of data addressed to the system.

11. The method according to claim 1, further comprising the steps of:

maintaining a count of invalid attempts to wake up the system; and incrementing the count if the packet of data does not include the password sequence having the predetermined relationship with the password required to wake up the system.

12. The method according to claim 11, further comprising the step of:

controlling a frequency rate of invalid attempts to wake up the system.

13. The method according to claim 12, further comprising the step of:

discarding for a period of time subsequent packets of data addressed to the system when the count of invalid attempts exceeds a predetermined limit.

14. A method for remotely waking up a computer over a network, comprising the steps of:

detecting a packet of data addressed to the computer, the computer operating in a sleep state wherein a first portion of the computer is supplied power so that the computer can detect the packet, the first portion of the computer including a device operating in a remote access control mode;

determining whether the packet of data is a wake-up packet having an address sequence corresponding to an address of the computer;

determining, in response to determining the packet of data is a wake-up packet, whether the wake-up packet includes a password sequence having a predetermined relationship with a password required to wake up the computer; and providing electrical power to a second portion of the computer to wake up the computer if the wake-up packet is determined to have the password sequence.

15. A method for remotely waking up a computer over a network, comprising the steps of:

detecting a packet of data addressed to the computer, the computer operating in a sleep state wherein a first portion of the computer is supplied power so that the computer can detect the packet;

determining whether the packet of data has a particular data sequence including a password sequence having a predetermined relationship with a password required to wake up the computer;

providing electrical power to a second portion of the computer to wake up the computer in response to determining that the packet of data has the particular data sequence;

generating a new password in response to providing electrical power to the second portion of the computer;

transmitting the new password to a station coupled to the network capable of having transmitted the packet of data to the computer; and storing the new password in the computer.

16. An apparatus for remotely waking up a processor-based system over a network, comprising:

a network interface coupled to the network for detecting a packet of data addressed to the system and determining whether the packet of data has a particular data sequence including a password sequence having a predetermined relationship with a password required to wake up the system; and means coupled to the network interface for providing electrical power to the system to wake up the system in response to the network interface determining that the packet of data has the particular data sequence.

17. The apparatus according to claim 16 wherein the network interface is capable of selectively operating in a remote access control mode; and wherein the network interface detects the packet of data if the network interface is operating in the remote access control mode.

18. The apparatus according to claim 16, further comprising:

a memory coupled to the network interface, the memory storing data representing a security mode in which the network interface is to operate when the system is operating in a sleep state.

19. The apparatus according to claim 18, further comprising:

circuitry detecting when electrical power is being removed from the system; and means for configuring the network interface according to the mode stored in the memory.

20. The apparatus according to claim 18, wherein the memory is a serial non-volatile memory (NVRAM), the network interface and the NVRAM being supplied electrical power when the system is operating in the sleep state.

21. A computer for connecting to a network, comprising:

a processor;

a disk drive coupled to the processor;

a network interface controller coupled to the processor and connectable to the network, the network interface controller operable to detect a packet of data addressed to the computer and determine whether the packet of data has a particular data sequence including a password sequence having a predetermined relationship with a password required to wake-up the computer; and power-control circuitry operable to provide power to the computer, including the processor and the disk drive, in response to a signal from the network interface controller upon determination that the packet of data has the particular data sequence.

22. The computer of claim 22, wherein the network interface controller further includes:

a device for storing the password.

23. The computer of claim 22, wherein the network interface controller is further operable to generate a new password, transmit the new password over the network to a second computer, and store the new password in the device.

24. The computer of claim 23, wherein the network interface controller generates, transmits and stores the new password each time power is provided to the computer to wake-up the computer.

25. The computer of claim 23, wherein the network interface controller is further operable to encrypt the new password before transmitting the new password.

26. The computer of claim 22, wherein the network interface controller is further operable to receive a new password generated by a second computer on the network in response to the particular data sequence.

27. A method of waking up a remote computer attached to a network, comprising the steps of:

forming a packet of data addressed to the computer;

including in said packet a particular data sequence containing a password sequence having a predetermined relationship with a password used to wake-up the computer; and providing said packet to the computer over the network.

28. The method of claim 27, further comprising the steps of:

generating a new password for waking up the computer;

transmitting the new password over the network; and storing the new password.

29. The method of claim 28, further comprising the step of:

encrypting the new password before transmitting the new password.

30. The method of claim 28, wherein the step of generating the new password is performed by the computer, and the step of transmitting the new password operates to transmit the new password from the computer to a second computer.

31. The method of claim 28, further comprising the step of:

receiving an acknowledgement from the computer receiving the new password, wherein the step of storing the new password operates in response to receiving the acknowledgement.

\* \* \* \* \*